United States Patent [19]

Embree et al.

[11] Patent Number: 4,567,333
[45] Date of Patent: Jan. 28, 1986

[54] ELECTRONIC TONE RINGER WITH DISTINCTIVE SIGNALING CIRCUITRY

[75] Inventors: David M. Embree; David C. Goldthorp, both of Reading, Pa.; Howard H. Longenecker; David R. Vogelpohl, both of Indianapolis, Ind.

[73] Assignees: AT&T Technologies; AT&T Bell Laboratories, both of Murray Hill, N.J.

[21] Appl. No.: 643,343

[22] Filed: Aug. 23, 1984

Related U.S. Application Data

[62] Division of Ser. No. 470,150, Feb. 28, 1983, Pat. No. 4,491,691.

[51] Int. Cl.<sup>4</sup> ............................................. H04M 1/00
[52] U.S. Cl. .................................. 179/84 T; 331/111; 331/47; 328/133
[58] Field of Search ............ 179/84 T, 84 SS, 84 VF, 179/84 R, 84 A; 328/138; 307/271; 323/315; 340/384 E; 331/177 R

[56] References Cited

U.S. PATENT DOCUMENTS

4,292,604 9/1981 Embree et al. ................. 331/177 R

Primary Examiner—James L. Dwyer
Attorney, Agent, or Firm—Samuel R. Williamson

[57] ABSTRACT

An electronic tone ringer provides a distinctive ringing capability through the use of two oscillators which allow selection of four tones and four modulation rates. In determining the type of tone generated, formattable inputs select between frequency shift or amplitude modulation modes or disabling the modulation altogether to generate a single tone. In the frequency shift mode, two fundamental frequencies are generated which are related by a predetermined ratio, the output tone alternating between these two frequencies at one of four selectable modulation rates. In the amplitude modulation mode, a single frequency is switched on and off at the selected modulation rate. All of the tones are produced with a duty cycle appropriate for driving an electromagnetic acoustic transducer.

8 Claims, 13 Drawing Figures

FULL WAVE RECTIFIED RINGING SIGNAL

BAND GAP VOLTAGE THRESHOLD

FIG. 9

MAGNITUDE COMPARATOR OUTPUT

FIG. 10

DIAL PULSE RELAY TRANSIENT

BAND GAP VOLTAGE THRESHOLD

FIG. 11

MAGNITUDE COMPARATOR OUTPUT

FIG. 12

ELECTRONIC TONE RINGER WITH DISTINCTIVE SIGNALING CIRCUITRY

This application is a division of application Ser. No. 470,150, filed Feb. 28, 1983 now U.S. Pat. No. 4,491,691.

TECHNICAL FIELD

This invention relates to tone ringers, and more particularly, to the type of tone ringer that may be used in a telephone system.

BACKGROUND OF THE INVENTION

The use of conventional electromechanical bell ringers has been the primary signaling device used in telephones for a great number of years. In recent years, however tone ringers considered to be more desirable have been replacing the electromechanical bell ringer due to advances in electronic technology. The tone ringers provide a signal generally considered substantially more pleasing to the average ear than the sound of an electromechanical bell ringer. Also, space requirements through use of tone ringers are minimized. These tone ringers comprise both electronic circuitry that responds to conventional low frequency power ringing signals on a telephone line, and also a tone generating transducer that provides an alerting signal to a telephone subscriber. An example of such a tone ringer is disclosed in U.S. Pat. No. 4,276,448, issued to M. L. Embree et al. on June 30, 1981.

Telephone ringers have to reliably operate in an environment containing a wide variety of other signals that are intentionally and unintentionally coupled to the telephone line. Some electronic ringers in the art have had the tendency to sound in response to these signal transients on the telephone line caused by dialing pulses or the line being seized prior to ringing. Because of the magnetic and mechanical time delays inherent in the electromechanical ringer, it was not prone to respond to such line transients. It is desirable, therefore, to provide a tone ringer with these general characteristics which is capable of increased accuracy in distinguishing between valid ringing signals and the voltage pulses and other transients coupled to the telephone line.

Telephone ringers have to also operate over a loop whose length can vary considerably. Although more efficient than electromechanical bell ringers, tone ringers of the known art are optimized to operate over loops not exceeding a certain length since the ringers have an operational voltage range. Telephone extensions with ringers increase the load presented to the ringing voltage resulting in a further decrease in the available voltage. Thus, the value of the current available to the tone ringer is a critical, sensitive factor, particularly so in those instances where multiple sets are terminated on a line. It is desirable, therefore, to provide a tone ringer which allows for efficient operation over a wide range of loop lengths and multiple extensions being terminated on the telephone line.

Since telephone ringers are usually terminating a telephone line at all times, they should have an input impedance characteristic which is tailored to be very high for low voltage levels in the voice frequency band so as to not attenuate voice signals. Furthermore, it is desirable to have the telephone ringer provide a unique impedance signature so that the continuity of the telephone loop from the central office to the telephone subscriber can be verified by loop maintenance test circuits located at the central office. This capability could aid in determining whether an existing trouble condition is on the telephone loop or at the subscriber's premises. It is desirable, therefore, to provide a tone ringer with a controllable input impedance characteristic.

In addition, tone ringers, in order to be truly effective, ought to have the capability to produce distinctive audible signals. The ever increasing range of services offered to telephone subscribers including PICTUREPHONE Meeting Service, audio teleconferencing, intercom calling, as well as conventional telephone service, necessitates the development of means to distinguish between the sound produced by one telephone or type of service and the audible signal produced by other sets or services. Where conventional electromechanical bell ringers are used, it is difficult to provide user controllable distinctive ringing, since their sound characteristics are usually varied by adjusting the natural frequency of the resonating element. On the other hand, where tone generating transducers are used, electronic circuitry can be provided to simply achieve the same result. Accordingly it is desirable to provide a tone ringer with an easily implemented distinctive ringing capability.

For low cost telephones which do not need a distinctive ringing capability, a piezoelectric transducer is often used. This type of transducer is characterized in that it has a very narrow frequency band width of peak efficiency. Accordingly, it is desirable for the tone ringer to produce a driving signal with a precisely controlled frequency in order to consistently drive a piezoelectric transducer at the frequency of its peak efficiency.

SUMMARY OF THE INVENTION

In accordance with the invention, there is provided a tone ringer which allows for optimum performance over a wide range of loop lengths and, therefore, supply voltage levels. The tone ringer includes a band gap reference which establishes a stable voltage reference that is imdependent of temperature and supply voltage variation over a large voltage range. The input ringing signals contain the total energy needed to provide the reference voltages for the tone ringer, power for the tone ringer circuitry and power to an associated acoustic transducer.

The tone ringer provides a controlled high input impedance characteristic. For voice frequency voltages less then 3 volts rms, the tone ringer provides an impedance of over 100,000 ohms. For loop maintenance test voltages of 10 volts rms at 24 Hz, the tone ringer provides an impedance of less than 25,000 ohms, thereby allowing verification of loop continuity from a central office to a telephone subscriber.

According to the present invention, the tone ringer circuit also comprises sensing means for distinguishing between valid ringing signals and unwanted transients, oscillatory generator means for energizing an output transducer through output circuit means and frequency determining means for varying the frequency of the oscillatory generating means. Organization of the circuit is such that implementation in the form of an integrated circuit is accomplished with a minimum number of external components.

The sensing means operates to distinguish between valid and invalid ringing signals by considering the relative duration of the ringing signal above a fixed voltage level. This function is accomplished by providing a loading circuit for the input ringing signal and then comparing and measuring the level of the input voltage on a time average basis. Hence, once an input voltage exceeding a first voltage reference level is presented to the tone ringer, a magnitude comparator changes from a first to a second state and remains in this second state, on the average, for a predominantly longer period of time for valid ringing signals, and reverts back to the initial state, on the average, for a loner period of time for dial pulse, switchhook and other transients. This method of signal discrimination is very effective since dial pulse or switchhook transients represent reverse electromotive force inductive energy. These transients are also characterized in that they are unsymmetrical spikes having rapid rise and decay times when terminated with a low impedance. Thus, they are dissipated and attenuated on a time average basis to a greater degree than the minimum central office ringing voltage at the telephone set when subjected to the loading circuit.

More specifically, when the input voltage is caused by a valid ringing signal, the magnitude comparator remains on average in the second state long enough for a binary counter to count to a number at which the tone ringer circuit is fully activated and the transducer will sound. On the other hand, if the input voltage is caused by a dial pulse or switch hook transient, the magnitude comparator will change back to its initial state on average for the greater time period. This prevents the counter from reaching the number at which the tone ringer circuit becomes fully activated and the transducer is inhibited from sounding. Thus, conventional ringing signals will be able to activate the tone ringer and cause an audible output signal, whereas transients and pulses up to several hundred volts will be unable to do so.

The oscillatory generator means is comprised of two separate oscillators. The first oscillator provides a distinctive ringing capability and determines the frequency and duty cycle of the signal which drives the transducer. The second oscillator is used to provide a modulation rate for the transducer driving signal and a clock frequency for the operation of the sensing means. The two oscillators thereby allow for ringing signal detecting circuitry in the sensing means and the output signaling frequency to be set independently.

To provide distinctive audible signaling in accordance with the invention, a number of selectable formats are incorporated into the frequency determining means in the tone ringer. In determining the type of tone generated, external inputs select between frequency shift or amplitude modulation modes or disabling the modulation altogether to generate a single tone. In the frequency shift mode, two fundamental frequencies are generated which are related by a ratio of 1.25:1, the output tone alternating between these two frequencies at one of four selectable modulation rates. In the amplitude modulation mode, a single frequency is switched on and off at the selected modulation rate. All of the tones are produced with a 28 percent duty cycle to facilitate driving an electromagnetic acoustic transducer.

The output circuit means couples the output of the oscillatory generator means to the acoustic transducer. It can be configured to drive either a piezoelectric capacitive type transducer or an electromagnetic inductive transducer. Signal level control is also provided to give high, medium, and low volume positions or continuous volume adjustment as desired.

BRIEF DESCRIPTION OF THE DRAWING

This invention will be more fully comprehended from the following description in the accompanying drawing in which.

DETAILED DESCRIPTION

Figure 1:
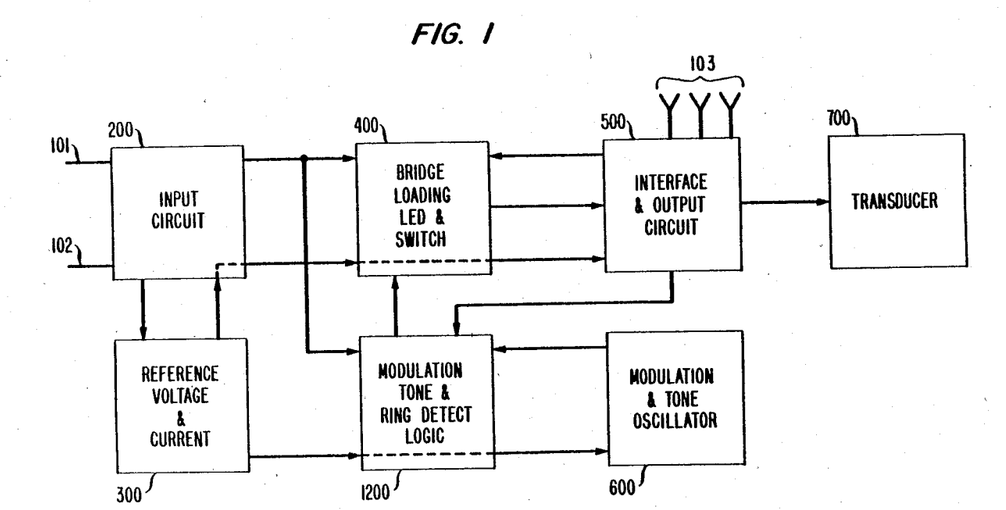
FIG. 1 is a block diagram of an electronic tone ringer showing the major functional circuit components of the ringer and their general interconnection with each other in accordance with the present invention.

FIG. 1 is a functional block representation of a tone ringer operative in accordance with the principles of this invention. Input ringing signals are coupled from the tip and ring lines 101 and 102 to an input circuit section 200. This section includes a series resistor and capacitor in the tip-ring circuit path, a diode bridge for full wave rectification of the incoming signals, a surge protection voltage clamp circuit, a resistor divider for providing ratioed full wave rectified input voltages, and a magnitude comparator for providing an indication when the incoming signal exceeds a predetermined voltage level.

A reference voltage and current section 300 provides voltage reference levels including a band gap voltage reference, and also current sources which are used throughout the tone ringer circuitry. This section also provides a power up reset function used by the tone ringer once a voltage on the input lines 101 and 102 exceeds a certain predetermined level.

Connected to the input circuit 200 is a bridge loading, LED driver and output switch section 400. This section contains a bridge load circuit which is connected in the path of the signal appearing at the input to the tone ringer to facilitate the detection of valid ringing signals. A ring detect indication suitable for driving a light emitting diode or other output device is also provided in this section 400 via a current source which is activated when a valid ringing signal is detected. Finally, concurrently with the detection of a valid ringing signal, the bridge load circuit is switched off and an interface and output circuit section 500 is enabled to allow the activation of an acoustic transducer 700 which can be either a piezoelectric capacitive type or an electromagnetic inductive type. This is possible since a pull-up pull-down stage is included in the interface and output circuit section 500.

A modulation and tone oscillator section 600 provides frequencies for required timing functions and for generating tones that activate the transducer 700. Two oscillators are implemented in this section. A first oscillator is used as a clock to set the operating rate for a modulation rate logic and ring detector logic in section 1200. The remaining oscillator sets the reference frequency of a tone logic in section 1200 and the output tone generated by the tone ringer. The use of two oscillators allows the modulation rate and output frequencies to be set independently.

Figure 12:
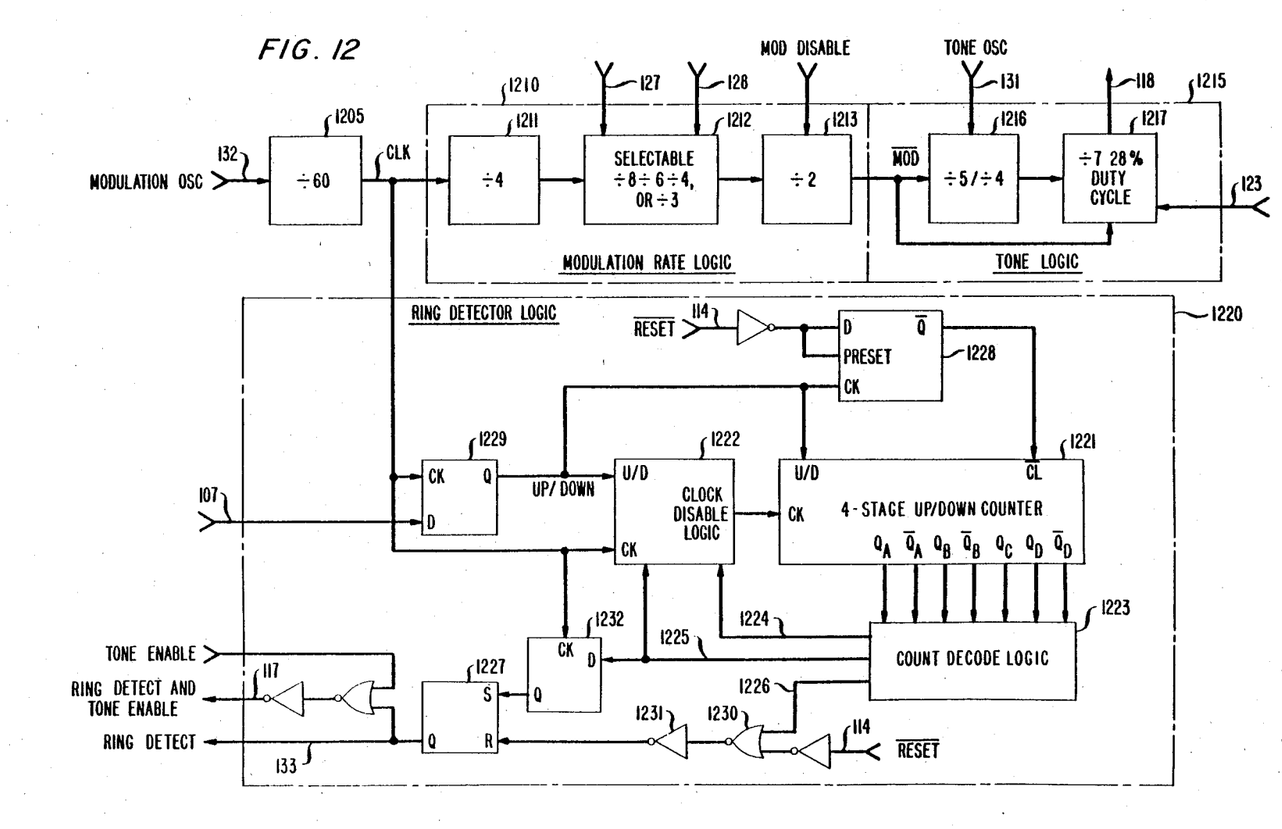
FIG. 12 is a schematic circuit diagram of the modulation rate logic, tone logic, and ring detector logic section of FIG. 1.
Figure 13:
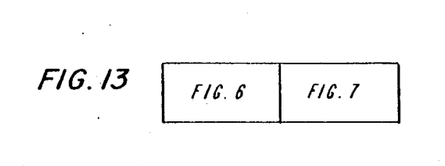
FIG. 13 illustrates the spacial arrangements of FIGS. 6 and 7.

The modulation rate logic, tone logic and ring detector logic section 1200 determines whether a voltage at the input lines 101, 102 of the tone ringer is from a valid ringing signal or a transient such as those caused by dial pulses or switchhook flashes. In response to external inputs on lines 103 provided via the interface and output circuit section 500, section 1200 selects one of four modulation rates for the output tones. Section 1200 also has circuitry to select between frequency shift or amplitude modulation of the output tones and to disable the modulation altogether to generate a single tone if desired. In the frequency shift mode two fundamental frequencies are generated which are related by a 1.25:1 ratio and are alternately selected at the modulation rate. In the amplitude modulation mode a single frequency is switched on and off at the modulation rate. The output tone from this section 1200 has a 28 percent duty cycle that is suitable for efficiently driving an electromagnetic acoustic transducer.

Figure 2:
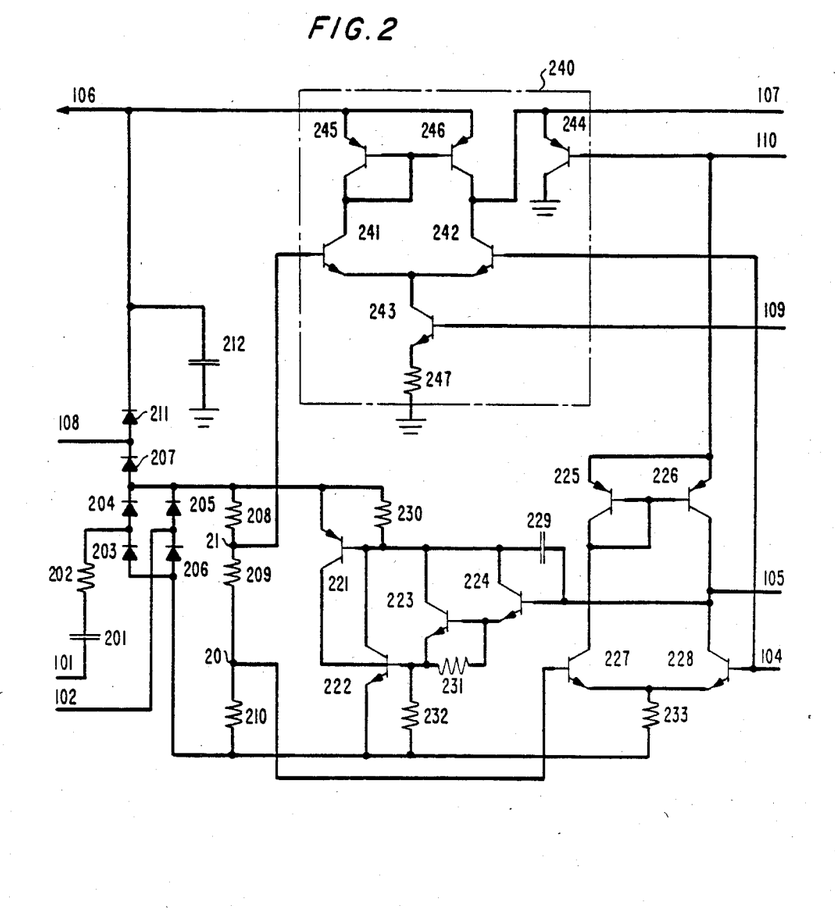
FIG. 2 is a schematic circuit diagram of the input circuit section of the tone ringer of FIG. 2.

Referring now to FIG. 2, there is shown a schematic diagram of the detailed circuitry of a diode bridge, input surge protection, resistor divider, and magnitude comparator circuits of the input circuit section 200 of FIG. 1. The input ringing signal appearing on lines 101 and 102 is coupled via a capacitor 201 and a resistor 202 to the diode bridge consisting of diodes 203 through 206. The output of this bridge (cathodes of diodes 204 and 205 and hereinafter referred to as the bridge voltage) is coupled to a diode 207 and to an input resistor divider network which consists of resistors 208 through 210. Diode 207 helps to increase the low voltage ac input impedance and is coupled via its cathode to a diode 211 and over line 108 to a bridge loading circuit to be discussed later. Diode 211 and a capacitor 212 form a full wave rectified and filtered supply for powering the remainder of the tone ringer circuitry over line 106.

The input surge protection circuit comprises transistors 221 through 228, capacitor 229 and resistors 230 through 233. Transistors 225 through 228 form a comparator circuit with a band gap voltage being provided over line 104 as the reference input. A tap on the resistor divider network indicated as node 20 connects a ratioed full wave rectified version of the ringing signal to the other input of the comparator circuit. When the voltage at the output of the diode bridge reaches 25 volts, the input resistor divider ratio sets the voltage on node 20 equal to the band gap reference voltage (1.31 volts). At voltages above this point, transistor 227 is turned on which causes transistor 226 to turn on transistor 222 via the Darlington transistor pair 223 and 224. Transistor 222 then prevents the bridge voltage from rising above 25 volts by pulling current through resistor 230 and the series resistor 202 and capacitor 201.

For excessive input voltage levels, transistor 222 will pull enough current through resistor 230 so that the base-emitter junction of transistor 221 becomes forward-biased. This causes the equivalent of a silicon controlled rectifier (SCR) formed by transistors 221 and 222 to fire and the bridge voltage to collapse to the saturation voltage of transistor 221 and the base-to-emitter voltage drop represented by transistor 222. Resistor 230 sets the current value to about 50 ma for this condition to occur. The antisaturation voltage input on line 105 is used to prevent the saturation of transistor 228.

Figure 10:
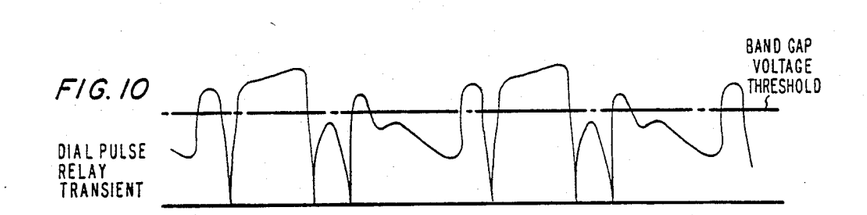
Figure 11:
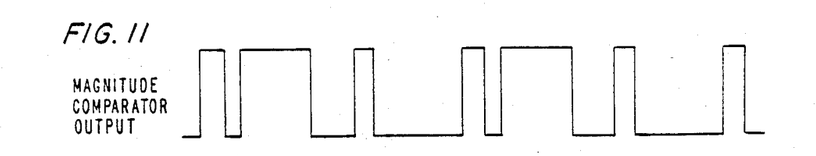

The magnitude comparator circuit 240 is comprised of transistors 241 through 246 and resistor 247. When the signal on the resistor divider network indicated as node 21 exceeds the band gap voltage on line 104, then transistor 241 turns on and transistor 242 turns off, which causes transistors 245 and 246 to turn on and an output on line 107 from the magnitude comparator 240 goes high. A better understanding of the operation of this comparator circuit 240 will be obtained by reference to FIGS. 8 through 11, FIGS. 8 and 10 representing typical voltage waveforms that may appear at node 21 and FIGS. 9 and 11 representing the corresponding output signal of the magnitude comparator 240 appearing on line 107. Transistor 244 provides on line 107 an interface for the magnitude comparator output of the signal to the buried injection logic (BIL) used for the ring detector logic 1220 later described herein. Current drive for current source transistor 243 and a regulated voltage reference for transistor 244 are respectively obtained over lines 109 and 110 from the reference voltage and current section 300 described next.

Figure 3:
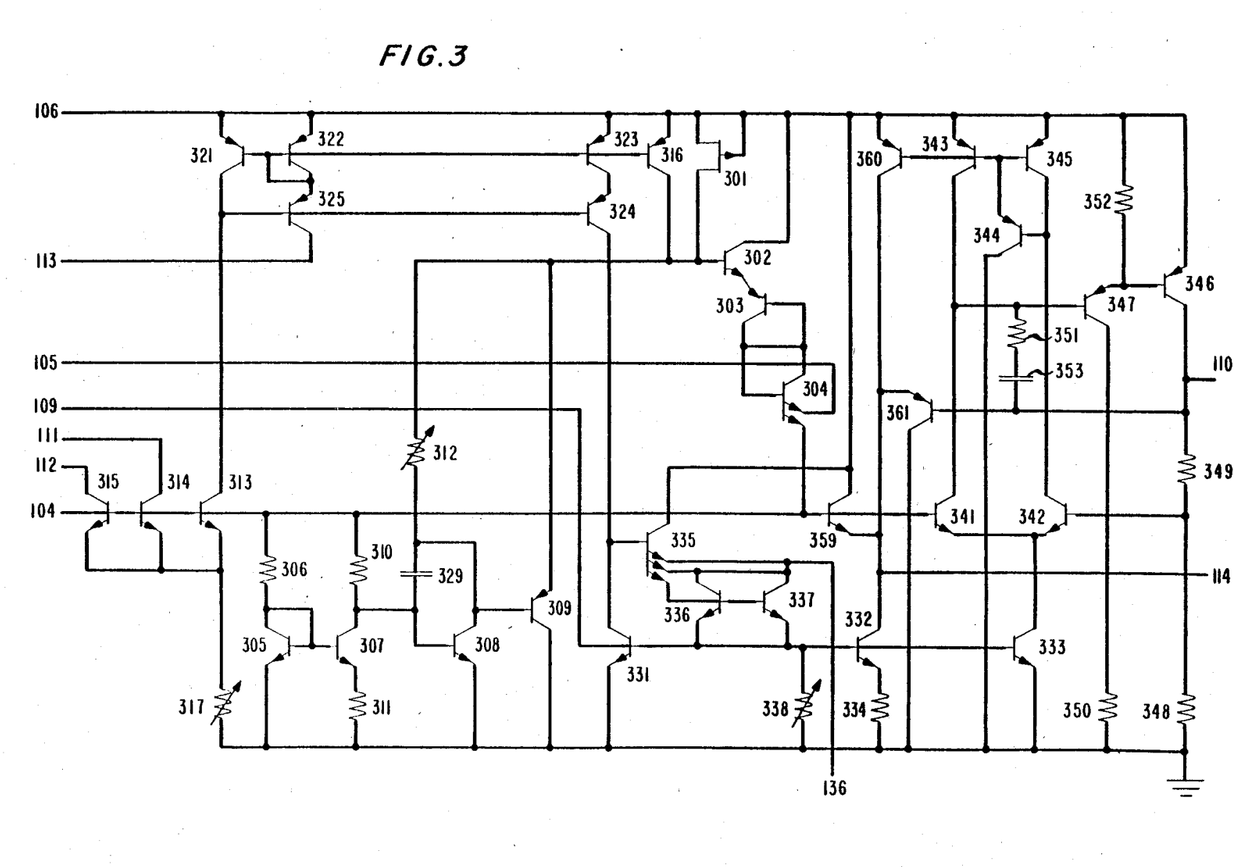
FIG. 3 is a schematic circuit diagram of the reference voltage and current section of the tone ringer of FIG. 1.

FIG. 3 presents a schematic circuit diagram of the reference voltage and current section 300. Besides providing reference current and voltage sources, this section provides a power up reset function for the modulation rate logic, tone logic and ring detector logic section 1200 over line 114 and sets the low voltage ac input impedance for the tone ringer. The start up path for the tone ringer includes diodes 203 through 206 in the diode bridge, diodes 207 and 211 all in the input circuit section 200, a field effect transistor 301, transistors 302 through 305 and a resistor 306.

This path contains eight effective diode drops which prevents the tone ringer circuit from drawing appreciable current until the voltage at the input exceeds about 4.5 volts. This characteristic gives a high input impedance for voltages less than 3 volts RMS across the voice frequency band. This highly nonlinear input impedance characteristic can be used in low voltage loop maintenance testing to identify the existence of a ringer termination and thus the continuity of the telephone loop to a station set. For input voltages above 6.0 volts, the tone ringer circuit is fully biased on and has an input impedance that is more than an order of magnitude lower than for voltages below 4.0 volts.

The bandgap reference voltage on line 104 is formed by transistor 305 and transistors 307 through 309, a capacitor 329, resistor 306 and resistors 310 through 312 in conjunction with the mirrored current source provided by transistor 316. The zero temperature coefficient voltage value is set to the desired voltage of 1.31 volts by adjusting resistor 312 through a series of trim links on the integrated circuit comprising the tone ringer.

This band gap reference is used to set up current source references on line 111 and 112 that are determined by the emitter size of transistors 313, 314, and 315 and also the value of resistor 317, which can be trimmed to give the desired current source values. The collector current of transistor 313 is used as the reference current for the Wilson current mirror configuration formed by transistors 321 through 325. Transistor 325 provides drive current over line 113 for a comparator in the bridge loading, LED and switching section 400 to be described later. The collector current of transistor 324 is coupled to transistor 331 which sets up an NPN current mirror configuration comprising transistors 331 through 333 and resistor 334. Also via line 109, transistor 243 in the input section 200, and finally transistors 406, 433, 438 and 443 through 445 in the bridge loading, LED driver and output switching section 400 are part of this current mirror.

Transistors 335 through 337, and resistor 338 serve as the beta helper for transistor 331 and are also used to set up the current which biases the buried injection logic on the integrated circuit via line 136. Transistor 333 and transistor 341 through 347 along with resistors 348 through 352 and capacitor 353 form a shunt voltage regulator circuit. Transistor 346 serves as the pass transistor. This circuit uses the band gap reference on line 104 and the ratio of resistors 348 and 349 to set the regulated voltage on line 110 to 3.6 volts. Transistors 332 and 359 through 361 are used to provide the power up reset signal to the ring detector logic 1220 on line 114. This line goes high to the potential on line 110 plus the base-to-emitter voltage drop of transistor 361 when the supply voltage on line 106 is large enough to keep the voltage on line 110 in regulation, and goes low to the potential on line 104 minus the base-to-emitter voltage drop of transistor 359 when the voltage on line 110 goes out of regulation.

Figure 4:
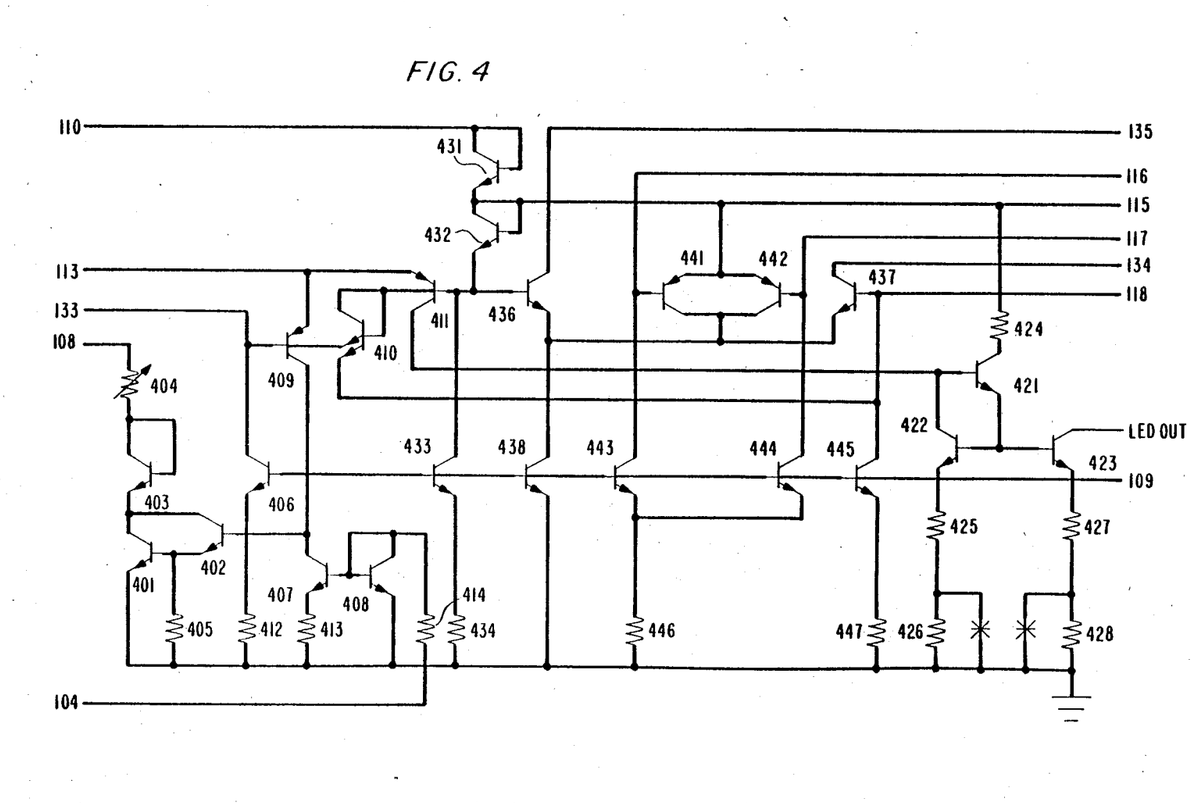
FIG. 4 is a schematic circuit diagram of the bridge loading, LED driver and output switch section of the tone ringer of FIG. 1.

FIG. 4 presents a schematic circuit diagram of the bridge loading, LED driver, and output switching circuitry section 400. As earlier indicated, the bridge loading circuit attenuates the signals on the output of the bridge such that the output of the magnitude comparator is high, on the average, for a predominantly longer period of time for valid ringing signals, and it is low, on the average, for a longer period of time for dial pulse transients as shown in FIGS. 10 and 11. Magnitude signals of this nature allow the ring detector logic section 1220 to distinguish valid from invalid ringing signals as hereinafter described.

The output of the bridge in section 200 is coupled over line 108 to the bridge loading circuit comprising transistors 401 through 403 and resistors 404 and 405. Resistor 404 is trimmed to draw a fixed amount of input current with the goal being to set the input current with the voltage on one input of the magnitude comparator in the input circuit section 200 adjusted to a level that will exceed the band gap reference voltage on the other input of the comparator in response to input signals appearing across line 101 and 102. The characteristic of the loading circuit is linear once the input voltage provides sufficient bias therefor.

Transistors 406 through 411 and resistors 412, 413, and 414 provide the switching mechanism which switches the bridge load out and enables the ring detected current source output when a valid ringing signal has been detected. Before ringing is detected, line 133 is at a logic zero which allows transistor 406 to turn on transistor 409, which in turn drives the bridge loading transistors 401 and 402 via the collector current of transistor 409. Transistors 407 and 408 ensure that the bridge load circuit is turned off once the differential pair formed by transistors 409 and 411 receives a ring detect signal (logic one) from the ring detector logic section 1220 over line 133. Transistor 410 provides a bias potential for transistors 409 and 437. When ringing has been detected, line 133 goes to a logic one which turns off transistor 409 and causes transistor 411 to conduct and pass the current from transistor 325 in FIG. 3 over line 113 to a ring detected current source formed by transistors 421 through 423 and resistors 424 through 428. Transistors 422 and 423 form a current mirror with transistor 421 being used as the beta helper.

The output of transistor 423 is a current which is suitable for driving the LED of an optoisolator. A logic level ring detect output is available as an alternative, however, by simply connecting a resistor between the collector of transistor 423 and a voltage reference. In this case, transistor 423 is allowed to saturate with its substrate current limited by resistor 424. Resistors 426 and 428 are used to adjust the output current to the desired range.

Figure 5:
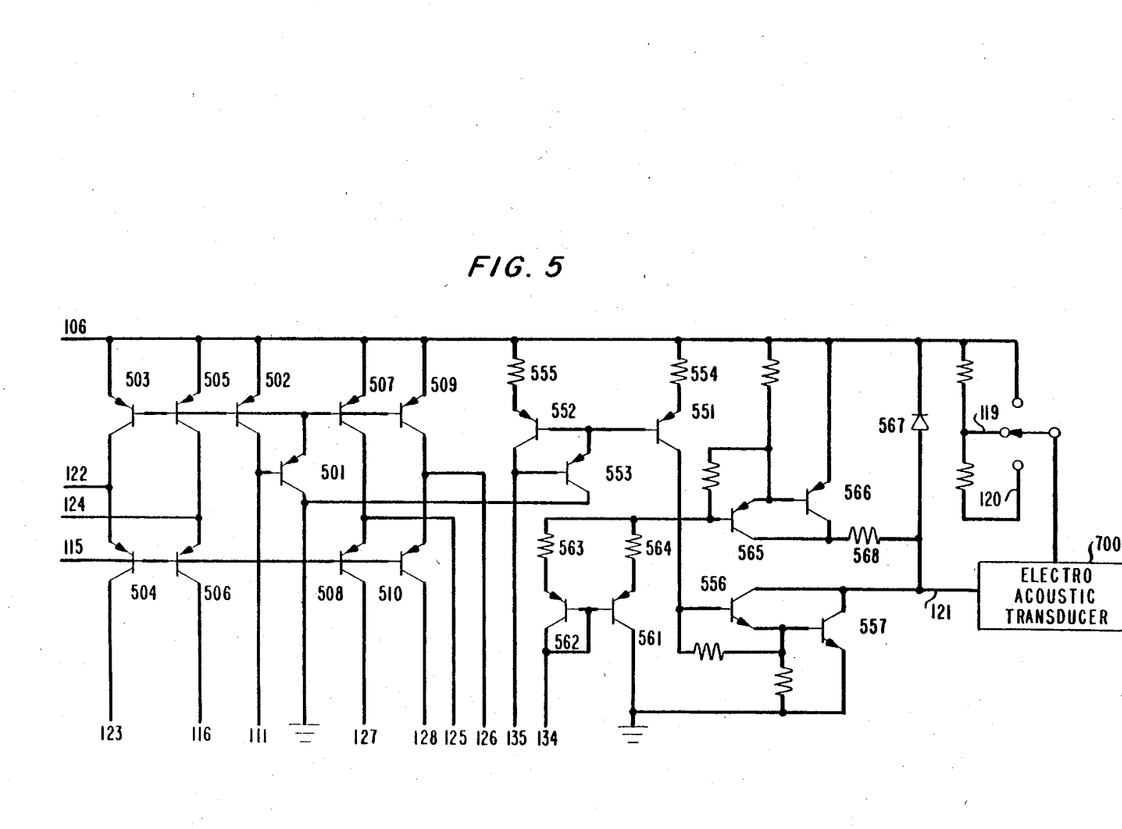
FIG. 5 is a schematic circuit diagram of the interface and output circuit section of the tone ringer of FIG. 1.

Transistor 431 sets up a voltage which is used to power the BIL logic on line 115. Transistors 432 and 433 and resistor 434 provide the voltage reference input level to the bases of comparator transistors 411 and 436. Transistor 436 is part of an output switching comparator which also comprises transistors 437 and 438. This comparator is used to control, over lines 134 and 135, the switching of an output pull-up/pull-down circuit to be described later. Transistors 441 through 445 with resistors 446 and 447 form a control circuit and logic interface for the output switching comparator described above. Transistors 441 and 443 interface over line 116 to the collector of transistor 506 in the interface and output circuit section 500 such that when transistor 506 is turned off under external control of a RING INHIBIT signal on line 124, then transistor 441 is turned on and the output switching comparator transistors 436 and 437 are disabled. With transistors 436 and 437 off, the output circuit in section 500 is disabled via lines 134 and 135, and no output tone is produced.

Transistors 442 and 444 perform a similar function under the control of the RING DETECT and TONE ENABLE logic signal, such that until the ring detector logic section 1220 detects a valid ringing signal and provides an indication (logic one) over line 117 the output circuit in section 500 is again disabled. The base of transistor 437 interfaces over line 118 to the BIL tone logic section 1215 which toggles the output switching comparator. The tone logic output signal pulls up the base of transistor 437 turning it on, with a 72 percent duty cycle so that transistor 436 is on 28 percent of the tone period.

FIG. 5 presents a schematic circuit diagram of the interface and output circuit section 500. The interface circuit provides for external control of the tone ringer features including the type of modulation, modulation rate, and also RING INHIBIT. The features allowing for tone enable and modulation disable are options designed on the integrated circuit, but are available only if one or two of the above four features is not selected or, alternatively, additional interfaces are provided. When not used, the logic inputs for these features are tied low to disable them. Their operation is described in section 1200.

The four interfaces shown in this section are identical and operate based upon a current mirror established by transistors 501 and 502 and the reference current provided over line 111 from transistor 314 shown in FIG. 3. The interfaces are also referenced to the BIL logic supply on line 115. The first interface comprises transistors 503 and 504. If external input line 122 is left open or at a high level, then transistor 504 is on and the logic input on line 123 is pulled high causing the tone ringer to provide a frequency modulated tone via tone logic section 1215. If the line 122 is pulled low, then transistor 504 turns off and the BIL logic input on line 123 goes low resulting in the type of modulation changing to amplitude modulation. The second interface comprises transistors 505 and 506. A low level signal on input line 124 operates the RING INHIBIT feature of the tone ringer via line 116. A low level signal on line 124 disables transistor 506 and enables transistor 441 shown in FIG. 4 to turn on. The third and fourth interface comprises transistors 507 and 508, and transistors 509 and 510 respectively. In combination, they perform the function of changing the modulation rate of the tone that is generated. By selecting either input line 125 or input line 126 or both, the modulation rate of the modulation rate logic section 1210 can be varied from 20 to 15 to 10 or to 7.5 Hz via lines 127 and 128.

The output circuit is controlled by the output switching comparator found in the bridge loading, LED drive and output switching section 400. When transistor 436 is on, then via line 135 the current mirror comprising transistors 551 through 553, resistors 554 and 555 turns on the NPN Darlington pair transistors 556 and 557. The transducer is connected between lines 106 and 121 for the standard high volume output. If a reduced volume is desired, the transducer is connected between lines 119 or 120 and line 121 for the medium or low volume position respectively. Since transistor 436 is on for 28 percent of the tone period, the transducer is pulsed on with a 28 percent duty cycle. This is an important consideration when driving an electromagnetic transducer to obtain maximum acoustic output. Alternatively, when transistor 437 is switched on, then the current mirror formed by transistors 561 and 562 and resistors 563 and 564 turn on the PNP Darlington pair transistors 565 and 566 via line 134. This pull-up/pull-down output drive is necessary to drive capacitive piezoelectric type transducers. Diode 567 is used as a flyback diode to shunt the reverse EMF generated when driving an electromagnetic transducer with a pulse. And resistor 568 limits the peak current generated when driving a piezoelectric transducer in order to more efficiently transform the electrical energy into acoustic energy.

Figure 6:
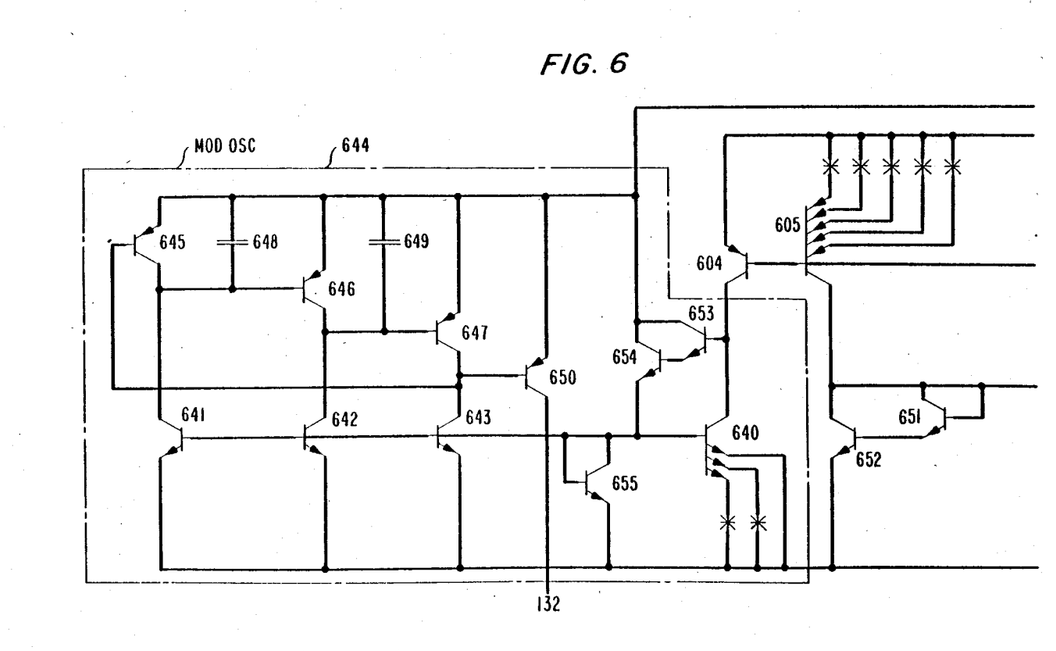
FIGS. 6 and 7 present a schematic circuit diagram of the modulation and tone oscillator section of the tone ringer of FIG. 1.
Figure 7:
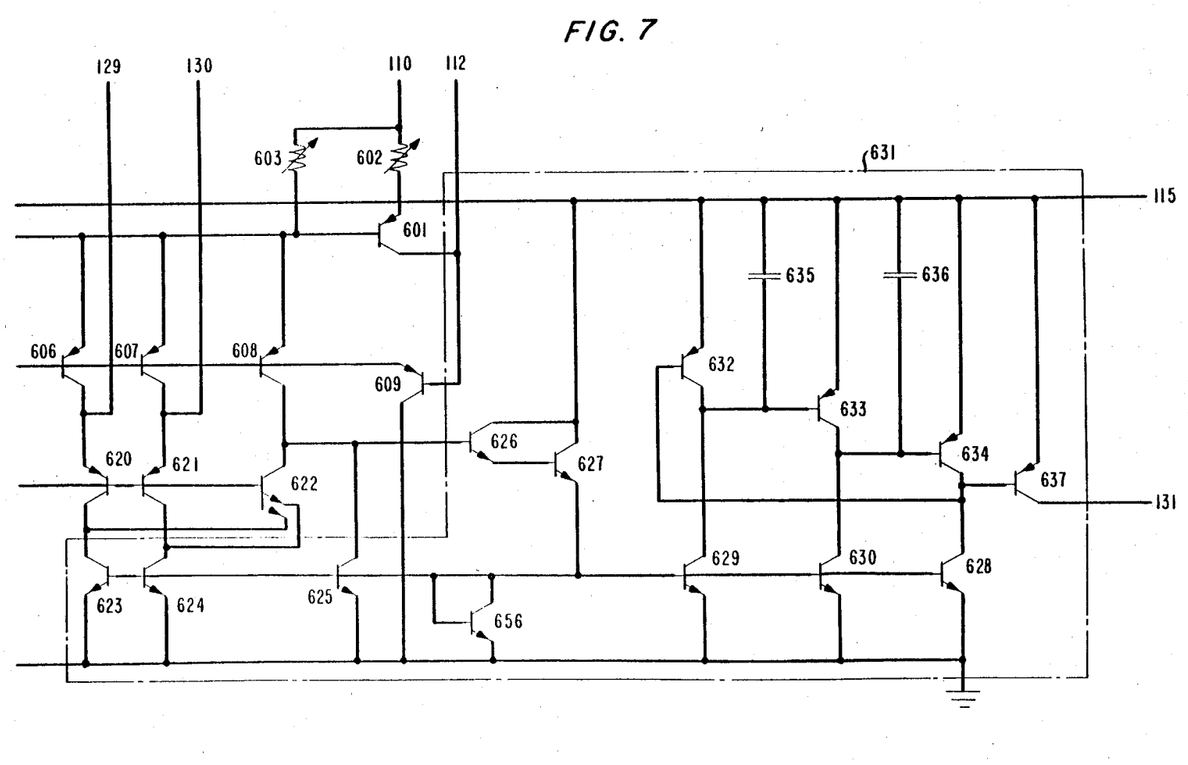

FIGS. 6 and 7 present a schematic circuit diagram of the modulation and tone oscillator section 600. Two oscillators are implemented on the integrated circuit of the tone ringer. A first oscillator is used to set the modulation rate and operate the ring detector logic section while the other sets the frequency of the output tone generated by the tone ringer. The two oscillators share a common current source reference comprising transistor 601 and resistors 602 and 603, and transistor 315 and resistor 317 shown in FIG. 3. Transistor 315 and resistor 317 set up a current reference based on the band gap voltage and the value of resistor 317. This current is then used to set up a temperature dependent current reference based upon the trimmed values of resistors 602 and 603 and the base to emitter-voltage (Vbe) drop of transistor 601. The temperature coefficient of this reference is used to cancel the inherent temperature coefficient in the ring type oscillators 631 and 644. This current reference then feeds the current divider formed by transistors 604 through 609. The current in each leg of the divider and thus the frequency of the oscillators, is determined by trimming resistors 602 and 603, and the multiple emitters of transistor 605. The emitter trimming of transistor 605 determines the ratio of current in each leg of the current divider.

The current divider formed by transistors 606 through 609 feeds transistors 620 through 630 which form the switchable ratio current mirror for the tone oscillator 631. Transistors 651 and 652 provide a bias potential for transistor 620 through 622. The collector current of transistor 608 is passed through the multiple emitter buffer of transistor 622 to the switchable NPN current mirror reference set up by transistors 623 through 627. Transistors 626 and 627 form the beta helpers for transistor 623 through 625, while transistor 656 acts as a bias path for the helper. The inputs on a first frequency shift control line 129 and a second frequency shift control line 130 determine whether transistor 623 and 624 are part of the current mirror reference. If line 129 is pulled low and line 130 open, then transistor 620 is off, transistor 621 is on and the reference current in the collector of transistor 608 is divided between both transistor 623 and 625. This effectively increases the emitter ratio of the setup transistor in the mirror and reduces the currents in the remainder of the mirror transistors.

With control line 130 open, transistor 621 is on which reverse biases the emitter of transistor 622 that is connected to the collector of transistor 621. This then removes transistor 624 from the mirror reference. If both contol lines 129 and 130 are pulled low, then transistors 623 through 625 form the setup transistor for the mirror and the lowest valued current sources are generated in the remainder of the mirror. This condition yields the lowest frequency from the tone oscillator 631. The relationship between the selected frequencies is controlled by appropriately scaling the emitter sizes of transistors 623 through 625. Transistors 632 through 634 with capacitors 635 and 636 form a conventional ring oscillator whose frequency is controlled by the current sources in transistors 628 through 630. Transistor 637 provides an interface for the tone oscillator 631 to the tone logic circuit over line 131.

The modulation oscillator functions similarly to the tone oscillator, except that the current mirror ratio is not switchable. Transistors 653, 654 and 655 serve the same function in oscillator 644 as transistors 626, 627 and 656 do in oscillator 631. The frequency of the modulation oscillator can be adjusted, however, by trimming the emitters of transistor 640 which adjusts the current mirror ratio. In this oscillator, transistors 641 through 643 are used to form the current sources which determine the frequency of the ring oscillator 644 formed by transistors 645 through 647 and capacitors 648 and 649. Transistor 650 provides an interface for the modulation oscillator 644 to the modulation rate logic circuit 1210 over line 132.

Referring now to FIG. 12 there is shown the modulation rate logic, tone logic and ring detector logic section 1200. The output frequency of the modulation oscillator 644 is divided by 60 by a frequency reducing subcircuit 1205 and then applied as the clock input, CLK, for both the ring detector logic 1220 and the modulation rate logic 1210. In the modulation rate logic 1210, the clock is divided by four in frequency reducing subcircuit 1211 and then further divided by eight, six, four or three in frequency reducing subcircuit 1212 depending on the status of external inputs on lines 127 and 128 from the interface and output circuit section 500. A subcircuit 1212 consists of a divide by 8 counter whose outputs are decoded and fed back to give the other division rates depending on the state of lines 127 and 128. With both inputs open a divide by three is selected and with both pulled low a divide by eight is selected. The output of subcircuit 1212 is divided by two by subcircuit 1213 to give a 50 percent duty cycle output at 7.5 Hz, 10 Hz, 15 Hz or 20 Hz depending on the status of lines 127 and 128. When used, the optional MOD DISABLE input inhibits the modulation rate logic 1210 and makes the MOD output signal from subcircuit 1213 high.

The tone logic 1215 receives the output of the tone oscillator 631 over line 131. Count reducing subcircuit 1216 takes the tone oscillator input and divides it by five or four at the modulation rate provided by the modulation rate logic 1210. When the MOD output signal is high a divide by five is selected, and when low a divide by four is selected. Thus, the ratio between the two fundamental frequencies generated is 1.25:1. The output of subcircuit 1216 is further divided by seven by subcircuit 1217 with the output on line 118 being high for two pulses out of seven to yield a 28 percent duty cycle for the tone logic output signal.

When low, the input signal on line 123 from the interface and output circuit section 500 changes the type of modulation from frequency shift to amplitude by switching the output of subcircuit 1217 low when the modulation output MOD is low. The resultant tone logic output signal on line 118 with line 123 low is the tone oscillator frequency on line 131 divided by 35 which is switched on and off at the modulation rate. With line 123 high, the tone logic output on line 118 is the tone oscillator frequency first divided by 35 when MOD is high and secondly, divided by 28 when MOD is low. By controlling the modulation disable input, the type of modulation input, the tone oscillator frequency with its two external inputs, and the modulation rate with its two external inputs, a total of 36 different acoustic outputs are available from the tone ringer.

The ring detector logic 1220 uses the modulation oscillator signal (CLK), magnitude comparator signal on line 107 and the RESET input on line 114 to implement a digital integration and detection scheme which distinguishes valid from invalid ringing signals. As earlier indicated, the ring detector logic 1220 functions in coordination with the bridge loading circuit in section 400 and magnitude comparator in section 200. The digital integration is accomplished with a four stage up/down counter 1221 which is toggled with a detector clock signal from subcircuit 1205 and whose up/down input is controlled by the magnitude comparator signal on line 107. A count decode logic 1223 decodes three counter states which define a lower bound for the counter, an upper bound and ring detect state for the counter, and a state which resets the ring detect output after ringing ceases. The lower bound state is reflected by a signal on line 1224. The upper bound and reset states are respectively reflected by signals on lines 1225 and 1226.

When the RESET input is low, then the RING DETECT output on line 133 is held low by flip-flop 1227 and the up/down counter 1221 is cleared via the preset input of flip-flop 1228. The RESET input goes high based on a sufficient input voltage powering the tone ringer circuit as explained in the reference voltage and current section 300. At this time the D input of flip-flop 1228 is low and, since flip-flop 1228 is positive edge triggered, on the first positive edge of the up/down signal, the $\overline{Q}$ output of flip-flop 1228 goes high and the counter 1221 is allowed to start counting.

The up/down signal is derived from the magnitude comparator signal on line 107 by clocking it into a D flip-flop 1229 on the positive edge of the detector clock signal. The clock disable circuit 1222 disables the clock signal to the up/down counter 1221 if the up/down input is high and the counter is at the top of its count or if the up/down input and the counter is at the bottom of its count. This creates a bounded counter and prevents rollover in the counter.

Figure 8:
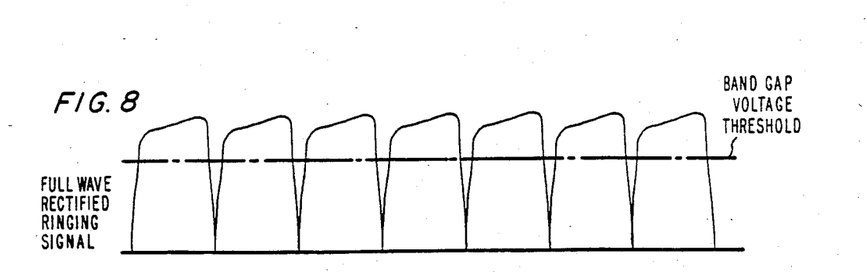
FIGS. 8 through 11 depict various voltage waveforms at points within the tone ringer.
Figure 9:
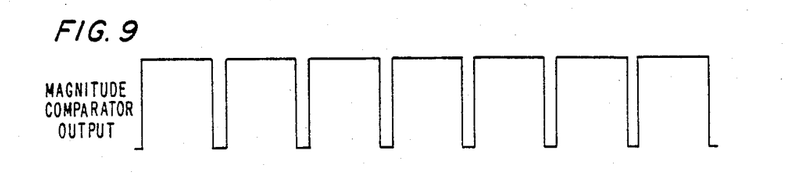

For a valid ringing signal indication the magnitude comparator signal must have a duty cycle greater than 50 percent as shown in FIGS. 8 and 9. This type of signal will cause the up/down counter 1221 to eventually reach the top of its count which generates a high signal on line 1225. On the positive edge of the detector clock signal the Q output of flip-flop 1232 sets flip/flop 1227 and puts a high level RING DETECT signal on line 133 and on line 117. If TONE ENABLE is high via the interface circuitry described in FIG. 5, a high level is also placed on line 117 independent of a high level ring detect signal. When the ringing signal is removed from input lines 101 and 102, the magnitude comparator signal on line 107 will go low and the counter 1221 counts down. When it reaches a preset count, line 1226 will go high and flip-flop 1227 is reset via NOR gate 1230 and inverter gate 1231. This resets flip-flop 1227 and makes the RING DETECT output signal on lines 133 and 117 low. The timing is set so that the counter wll not reach the preset count during the low interval of the magnitude comparator signal for normal ringing signals, and yet sound is terminated in a short time after ringing is removed from the line to provide a sharp turn-off characteristic for the tone.

Although a specific embodiment of the invention has been shown and described, it will be understood that it is but illustrative and various modifications may be made therein without departing from the scope and spirit of this invention as defined in the appended claims.

What is claimed is:

1. A tone ringer having input lines and operatively responsive to the reception of ringing signals applied across said input lines, the ringer comprising:
    an acoustic transducer for providing an audible output;
    oscillatory generator means comprising a first and a second oscillator for activating the acoustic transducer;
    the first oscillator providing a transducer activation signal, and the second oscillator providing modulation means for the transducer activation signal;
    sensing means for distinguishing between valid and invalid ringing signals applied across the input lines and for applying a ring activation signal to the oscillatory generator means when a valid ringing signal is detected; and
    frequency determining means connected to the oscillatory generator means for controlling the frequency of the transducer activation signal provided by the first oscillator, the frequency determining means including a switchable ratio current mirror for providing a control current to the oscillatory generator means, the current mirror providing a plurality of selectable current levels for a corresponding plurality of different frequency transducer activation signals from the oscillatory generator means.

2. The tone ringer as in claim 1 wherein the frequency determining means includes a first, a second and a third transistor connected in parallel arrangement with their emitters commonly connected to a first current source and their bases also commonly connected to the first current source, the current from the first current source being ratioed among the first, second and third transistors which provide their respective currents to a current mirror formed by a fourth, fifth and sixth transistor, the current from the collector of the first transistor being coupled to the collector of the fourth transistor, the current from the collector of the second transistor being coupled to the collector of the fifth transistor and the current from the collector of the third transistor being coupled to the collector of the sixth transistor, and the emitters of the fourth, fifth and sixth transistor being commonly connected to a reference potential, the bases of the fourth, fifth and sixth transistor being commonly connected to a voltage source through a Darlington pair transistor and providing the control current to the oscillatory generator means.

3. The tone ringer as in claim 1 wherein the frequency determining means further includes a seventh, eighth and ninth transistor respectively interposed between the first and fourth transistor, the second and fifth transistor, and the third and sixth transistors, the seventh and eighth transistors each having an input for respectively controlling the activation of the fourth and fifth transistor, the control current in a first operating condition being provided by the current through the sixth transistor, in a second operating condition being provided by the current through both the fifth and sixth transistors and in a third operating condition being provided by the current through the fourth, fifth and sixth transistors.

4. The tone ringer as in claim 1 wherein the first oscillator comprises a ring oscillator having multiple current sources used in determining its frequency of oscillation, the multiple current sources being operably responsive to the control current.

5. The tone ringer as in claim 1 wherein the modulation means further includes a frequency reduction circuit for providing a modulation rate of the transducer activation signal, the frequency reduction circuit being capable of providing a plurality of selectable modulation rates for modulating the transducer activation signal.

6. The tone ringer as in claim 5 further comprising modulation disable means, the modulation disable means being activatable to inhibit modulation of the transducer activation signal by the modulation means.

7. The tone ringer as in claim 6 wherein the second oscillator comprises a ring oscillator and includes multiple current sources for determining its frequency of oscillation.

8. The tone ringer as in claim 5, wherein the modulation means further includes means for selecting between amplitude modulation of the transducer activation signal and frequency shift modulation of the transducer activation signal.

* * * * *